US010249046B2

(12) United States Patent
Crivelli et al.

(10) Patent No.: US 10,249,046 B2
(45) Date of Patent: Apr. 2, 2019

(54) METHOD AND APPARATUS FOR OBJECT TRACKING AND SEGMENTATION VIA BACKGROUND TRACKING

(71) Applicant: THOMSON LICENSING, Issy les Moulineaux (FR)

(72) Inventors: Tomas Enrique Crivelli, Rennes (FR); Juan Manuel Perez Rua, Rennes (FR); Patrick Perez, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 100 days.

(21) Appl. No.: 15/314,497

(22) PCT Filed: May 26, 2015

(86) PCT No.: PCT/EP2015/061604
§ 371 (c)(1),
(2) Date: Nov. 28, 2016

(87) PCT Pub. No.: WO2015/181179
PCT Pub. Date: Dec. 3, 2015

(65) Prior Publication Data
US 2018/0247418 A1      Aug. 30, 2018

(30) Foreign Application Priority Data

May 28, 2014   (EP) ..................... 14305799

(51) Int. Cl.
*G06T 7/70*      (2017.01)
*G06T 7/194*     (2017.01)
(Continued)

(52) U.S. Cl.
CPC .............. *G06T 7/194* (2017.01); *G06T 7/215* (2017.01); *G06T 7/269* (2017.01); *G06T 7/70* (2017.01); *G06T 7/90* (2017.01)

(58) Field of Classification Search
CPC combination set(s) only.
See application file for complete search history.

(56) References Cited

U.S. PATENT DOCUMENTS

| 7,627,175 B2 * | 12/2009 | Le Clerc | ................. G06K 9/34 382/162 |
| 9,947,077 B2 * | 4/2018 | Wu | ........................ G06T 3/40 |

(Continued)

FOREIGN PATENT DOCUMENTS

| CN | 102930539 A | * | 2/2013 |
| CN | 103164858 A | * | 6/2013 |

(Continued)

OTHER PUBLICATIONS

Shekhovtsov et al., "Efficient MRF Deformation Model for Non-Rigid Image Matching", IEEE Conference on Computer Vision and Pattern Recognition, Minneapolis, Minnesota, Jun. 17, 2007, pp. 1-6.

(Continued)

*Primary Examiner* — Tsung Yin Tsai
(74) *Attorney, Agent, or Firm* — Jeffrey M. Navon

(57) ABSTRACT

A method for tracking an object commences by first establishing the object (12) in a current frame. Thereafter, a background region (202) is established encompassing the object in the current frame. The location for the object (12) is then estimated in a next frame. Next, the propagation of the background region (202) is determined. Finally, the object is segmented from its background based on propagation of the background region, thereby allowing tracking of the object from frame to frame.

12 Claims, 3 Drawing Sheets

(51) Int. Cl.
*G06T 7/215* (2017.01)
*G06T 7/269* (2017.01)
*G06T 7/90* (2017.01)

(56) References Cited

U.S. PATENT DOCUMENTS

| | | | | |
|---|---|---|---|---|
| 2004/0095492 | A1* | 5/2004 | Baxter | H04N 3/155 348/302 |
| 2013/0342559 | A1 | 12/2013 | Reso | |
| 2016/0163058 | A1* | 6/2016 | Wei | G06K 9/3233 382/171 |

FOREIGN PATENT DOCUMENTS

| | | | |
|---|---|---|---|
| CN | 103366382 A | * | 10/2013 |
| CN | 103413120 A | * | 11/2013 |

OTHER PUBLICATIONS

Baker et al., "A Database and Evaluation Methodology for Optical Flow", 11th IEEE International Conference on Computer Vision, Rio de Janeiro, Brazil, Oct. 14, 2007, pp. 1-8.

Tao et al., "SimpleFlow: A Non-iterative, Sublinear Optical Flow Algorithm", Computer Graphics Forum, Eurographics 2012, vol. 31, No. 2, May 2012, pp. 1-10.

Reso et al., "Temporally Consistent Superpixels", International Conference Computer Vision, Sydney, Australia, Dec. 3, 2013, pp. 385-392.

Crivelli et al., "Multi-step flow fusion: towards accurate and dense correspondences in long video shots", British Conference Machine Vision, Surrey, United Kingdom, Sep. 3, 2012, pp. 1-12.

Brox et al., "High Accuracy Optical Flow Estimation Based on a Theory for Warping", 8th European Conference on Computer Vision, Prague, Czech Republic, May 2004, pp. 24-36.

Achanta et al., "SLIC Superpixels Compared to State-of-the=Art Superpixel Methods", IEEE Transactions on Pattern Analysis and Machine Intelligence, vol. 34, No. 11, Nov. 2012, pp. 2274-2281.

Babenko et al., "Visual Tracking with Online Multiple Instance Learning",. IEEE Conference on Computer Vision and Pattern Recognition. 2009, Miami, Florida, USA, Jun. 20, 2009, pp. 983-990.

Boltz et al., "Earth Mover Distance on Superpixels", 17th International Conference on Image Processing, Hong Kong, Sep. 26, 2010, pp. 4597-4600.

Boros et al., "Preprocessing of Unconstrained Quadratic Binary Optimization", Rutgers Center for Operations Research, RUTCOR Research Report, RRR Oct. 2006, Apr. 2006, pp. 1-58.

Boros et al., "Pseudo-Boolean Optimization", Discrete Applied Mathematics, vol. 123, No. 1-3, Nov. 2002, pp. 155-225.

Heitz et al., "Multimodal Estimation of Discontinuous Optical Flow Using Markov Random Fields", IEEE Transactions on Pattern Analysis and Machine Intelligence, vol. 15, No. 12, Dec. 1993, pp. 1217-1232.

Boykov et al., "Interactive Graph Cuts for Optimal Boundary & Region Segmentation of Objects in N-D Images", IEEE International Conference on Computer Vision, Vancouver, British Columbia, Canada, Jul. 7, 2001, pp. 105-112.

Gallego et al., "Enhanced foreground segmentation and tracking combining Bayesian background, shadow and foreground modeling", Pattern Recognition Letters, vol. 33, No. 12, Sep. 2012, pp. 1558-1568.

Zhang et al., "Dim point target detection against bright background", Proceedings of SPIE, vol. 7724, Real-Time Image and Video Processing 2010, May 4, 2010, pp. 1-9.

Hare et al., "Struck: Structured Output Tracking with Kernels", IEEE International Conference on Computer Vision, Barcelona, Spain, Nov. 6, 2011, pp. 263-270.

Horn et al., "Determining Optical Flow", Artificial Intelligence, vol. 17, 1981, pp. 185-203.

Lempitsky et al., "FusionFlow: Discrete-Continuous Optimization for Optical Flow Estimation", IEEE Conference on Computer Vision and Pattern Recognition, Anchorage, Alaska, USA, Jun. 23, 2008, pp. 1-8.

Li et al., "An Anchor Patch Based Optimization Framework for Reducing Optical Flow Drift in Long Image Sequences", 11th Asian Conference on Computer Vision, Daejeon, Korea, Nov. 5, 2012, pp. 112-125.

Ren et al., Learning a Classification Model for Segmentation, IEEE International Conference on Computer Vision, Nice, France, Oct. 14, 2003, pp. 1-8.

Perbet et al., Homogeneous Superpixels from Random Walks, Conference on Machine Vision Applications, Nara, Japan, Jun. 13, 2011, pp. 26-30.

Yang et al., "Robust Superpixel Tracking", IEEE Transactions on Image Processing, vol. 23, No. 4, Apr. 2014, pp. 1639-1651.

Rother et al., ""Grabcut"—Interactive Foreground Extraction using Iterated Graph Cuts", 31st International Conference on Computer Graphics and Interactive Techniques SIGGRAPH 2004, Los Angeles, California, USA, Aug. 8, 2004, pp. 1-6.

Shi et al., "Good features to track", IEEE Conference on Computer Vision and Pattern Recognition, Seattle, Washington, USA, Jun. 21, 1994, pp. 593-600.

Sun et al., "Stereo Matching Using Belief Propagation", IEEE Transactions on Pattern Analysis and Machine Intelligence, vol. 25, No. 7, Jul. 2003, pp. 787-800.

Wu et al., "Online Object Tracking: A Benchmark", IEEE Conference on Computer Vision and Pattern Recognition, Portland, Oregon, USA, Jun. 25, 2013, pp. 2411-2418.

Xu et al., "Evaluation of Super-Voxel Methods for Early Video Processing", IEEE Conference on Computer Vision and Pattern Recognition, Providence, Rhode Island, USA, Jun. 16, 2012, pp. 1202-1209.

Yang et al., "A New Video Segmentation Approach: Grabcut in Local Window", 2011 International Conference of Soft Computing and Pattern Recognition, Dalian, China, Oct. 14, 2011, pp. 419-422.

Sundaram et al., "Dense Point Trajectories by GPU-Accelerated Large Displacement Optical Flow", 11th European Conference on Computer Vision—ECCV 2010, Heraklion, Crete, Greece, Sep. 5, 2010, pp. 438-451.

* cited by examiner

METHOD AND APPARATUS FOR OBJECT TRACKING AND SEGMENTATION VIA BACKGROUND TRACKING

This application claims the benefit, under 35 U.S.C. § 365 of International Application PCT/EP2015/061604 filed May 26, 2015, which was published in accordance with PCT Article 21(2) on Dec. 3, 2015, in English, and which claims the benefit of European Application No. 14305799.0, filed May 28, 2014. The European and PCT applications are expressly incorporated by reference herein in their entirety for all purposes.

TECHNICAL FIELD

This invention relates to tracking an object and segmenting it from the background.

BACKGROUND ART

Tracking of an object entails locating the object's position at successive instances with the object manually defined in the first frame or as the output of an object detector. In general, object tracking depends on extracting one or more characteristic features of the object (motion, color, shape, appearance) and using such characteristic feature(s) to estimate the position of the object in a next image frame, based on the object's position in the current image frame. A number of techniques exist for object tracking, including, optimal filtering, point-tracking, tracking-by-detection, optical-flow, and background subtraction, for example.

Proposals to refine object tracking have suggested gaining an advantage by modeling the foreground (the tracked object) and the background, and using this information to reject the estimated object positions most likely belonging to the background. The basic approach to such modeling entails extracting a model of the background appearance using color distributions learned in the first frame, for example, and updating such distributions along the sequence of images. However, such modeling requires prior knowledge of the background and the object, in order to learn the appearance of the object correctly. For this reason, foreground/background segmentation has become a key component in recent top-performing tracking devices. Moreover, even with correct initialization of the segmentation between the object and the background, present-day models often do not sufficiently discriminate between the object and the background for rigorously tracking the object. Finally, complete or partial occlusions of the object and changes in the appearance of the object resulting from rotation, illumination, shadows, and/or self-occlusions, for example, increase the difficulty of establishing a successful model adaptation strategy.

Thus, a need exists for a technique for object tracking that overcomes the foregoing disadvantages of the prior art.

BRIEF SUMMARY

Briefly, in accordance with the present principles, a method for tracking an object commences by first establishing the object (12) in a current frame. Thereafter, a background region (202) is established surrounding the object in the current frame. The location for the object (12) is then estimated in a next frame. Next, the propagation of the background region (202) is determined. Finally, the object is segmented from its background based on propagation of the background region, thereby allowing tracking of the object from frame to frame.

DETAILED DESCRIPTION

Figure 1:
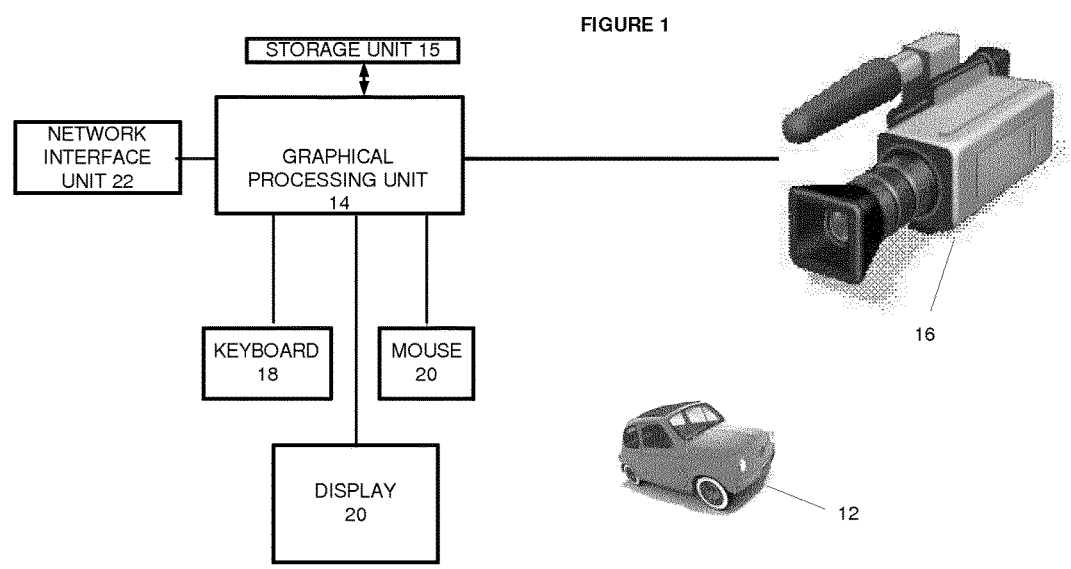
FIG. 1 depicts a block schematic diagram of a system for tracking an object in accordance with the present principles.

FIG. 1 depicts a block schematic diagram of a system 10 in accordance with the present principles for tracking an object 12, exemplified by an automobile, although the object could comprise virtually any article capable of undergoing imaging. The system 10 of FIG. 1 includes a graphical processing unit 14, which can comprise a general or special purpose computer programmed with software for tracking an image using the object tracking and object flow algorithms described hereinafter. In practice, such software resides in a storage device 15, for example a hard disk drive or the like, which can also store data produced by the graphical processing unit 14 during operation. Although described as a programmed computer, the graphical processing unit 14 alternatively could comprise discrete circuitry capable of tracking an object executing the object tracking and object flow algorithms described hereinafter. To track the object 12, the system 10 includes an image acquisition device 16 in the form of a television camera which supplies the graphical processing unit 14 with video signals represented the image of the object 12 captured by the television camera.

An operator (not shown) interacts with the graphical processing unit 14 through a keyboard 18 and/or mouse 20. The keyboard 18 and mouse 20 constitute examples of well-known operator data-entry devices, and the system 10 could make use of other such data entry device in place of, or in addition to, the keyboard and mouse. A display device 20, typically a monitor of a type well known in the art, displays information generated by the graphical processing unit 14 intended for observation by the operator.

The system 10 also typically includes a network interface unit 22, as are well known in the art for connecting the graphical processing unit 14 to a network, such as a Local Area Network (LAN) or Wide Area Network, as exemplified by the Internet. Although not shown, the system 10 could include one or more peripheral devices as well, such as a printer and or a plotter.

In accordance with the present principles, improved tracking of an object from image frame to image frame occurs by tracking not only the object, but by tracking a region, (e.g., a group of pixels) of the background surrounding the object, which enables improved segmentation of the object from the background as well as a better estimation of the object location. Thus, the object tracking accomplished by present principles involves object flow, comprising the combination of object tracking and background tracking. As discussed, tracking an object involves estimating the position of object in a next image frame, given an initial position of the object in a current image frame. On the other hand, the optical flow between a pair of frames necessitates finding a displacement vector for each pixel of the first image.

In order to segment the object from the image, the graphical processing unit 14 of the system 10 of FIG. 1 employs a super-pixel matching technique hereinafter referred to as "superpixel flow." The superpixel flow technique has as its objective finding the best match for every superpixel p in the first frame with a superpixel (p') in the next frame, while maintaining a global flow-like behavior. Thus, such superpixelization should maintain a certain size homogeneity within a single frame. Some existing pixel flow techniques can cope with this requirement. Preferably, the SLIC pixel flow method, well known in the art, gives good results in terms of size homogeneity and compactness of the superpixelization. Inspired by a large number of optical flow and stereo techniques, the superpixel flow of the present principles is modelled with a pairwise Markov Random Field. The matching is performed via maximum-a-posteriori (MAP) inference on the labeling l, which is equivalent to the minimization of an energy function of the form:

$$E(l) = \sum_{p \in r} D_p(l_p; I_0, I_1) + \sum_{(p,q): q \in N_r} S_{p,q}(l_p, l_q). \qquad (1)$$

With l representing the set of labels of the superpixels in $I_0$, that match with those in $I_1$.
$N_r$ defines a neighborhood of radius r of the superpixel p. The terms D, and S in equation (1) represent the data term and spatial smoothness term, respectively. The first term determines how accurate is the labeling in terms of consistency with the measured data (color, shape,etc.).

In the classical optical flow equivalent of equation (1), the data term corresponds to the pixel brightness conservation. However, since superpixels constitute a set of similar (e.g., homogeneous) pixels, an adequate appearance based feature is a low dimensional color histogram (with N bins). With regard to equation (1), D the Hellinger distance between the histograms is given by:

$$D_p(l_p; I_0, I_1) = \sqrt{1 - \frac{1}{\sqrt{h(p)h(p')N^2}} \sum_i \sqrt{h_i(p)h_i(p')}} . \qquad (2)$$

Where h(p) and h(p') are the color histograms of the superpixel p and its correspondent superpixel in the second frame b.
Empirically, a RGB color histogram with N=3 bins per color proved satisfactory. Note that such a low dimensional histogram gives certain robustness against noise, and slowly changing colors between frames. On the other hand, the spatial term constitutes a penalty function for the spatial difference of the displacement vectors between neighboring superpixels, where a displacement vector has its origin in the centroid of the superpixel of the first frame and its end in the centroid of the superpixel of the second frame.

$$S_{p,q}(l_p, l_q) = \lambda(p) \sqrt{\frac{|u_{p_c} - u_{q_c}|}{\|p_c - q_c\|} + \frac{|v_{p_c} - v_{q_c}|}{\|p_c - q_c\|}} , \qquad (3)$$

where, $\lambda(p)=(1+\rho(h(p), h(q)))^2$.

The operator ρ constitutes the Hellinger distance as used in the data term (2). The histogram distance is nonetheless computed between adjacent superpixels p and q, which belong to the first image. The superpixels centroids are noted as $q_c$ and $p_c$, and u* and v* and are the horizontal and vertical changes between centroids. This term has a smoothing effect in superpixels that belong to the same object. In practice, when two close superpixels are different, thus, probably belonging to different objects within the image, the term allows them to have matches that do not hold the smoothness prior with the same strength. The graphical processing unit 14 of FIG. 1 makes use of the Quadratic Pseudo-Boolean Optimization (QPBO) to minimize the proposed energy function, by merging a set of candidate matches for every superpixel in the first frame. The candidate matches are generated by assuming a proximity prior. This means, every possible match should lie inside a search radius in the second frame.

The object flow commences by computing the motion field for an object of interest through an image sequence. The most usual approach is to implement some of the available optical flow techniques through the complete sequence and perform the flow integration. However, doing so will result in high levels of motion drift and usually the motion of the interest object is affected by a global regularization. In some extreme cases, the interest object motion may be totally blurred and other techniques have to be incorporated. Moreover, the diversity of natural video sequences makes it difficult to choose one technique over another, even when specialized databases are at hand because currently no single method can achieve a strong performance in all of the available datasets. Most of these methods minimize the energy function with two terms. The data term is mostly shared between different approaches, but the prior or spatial term is different, and states under what conditions the optical flow smoothness should be maintained or not. In a global approach, however, this is a difficult to define. Most of these smoothness terms rely in appearance differences or gradients. Thus, some methods may be more reliable for some cases but weaker for others. This behavior may result because most of the techniques do not count in a manner to identify where exactly to apply this smoothness prior.

In accordance with the present principles, the graphical processing unit 14 of FIG. 1 can refine the optical flow computation by taking into account the segmentation mask within the tracked windows. The graphical processing unit 14 of FIG. 1 undertakes this refinement by considering the segmentation limits as reliable smoothness boundaries, assuming the motion is indeed smooth within the object region. This assumption remains valid for most scenes for a given object of interest. Naturally, the object flow should be more robust to rapid motions than the optical flow. Thus, the full motion will split in two, the long-range motion, given by a tracker window, as described hereinafter, and the precision part, given by the targeted optical flow. As a first approximation to the object flow, the Simple Flow used by the graphical processing unit 14 of FIG. 1 technique serves as the core base because of its scalability to higher resolutions and its specialization to the concept of object flow. By using the Simple Flow pipeline, the graphical processing unit 14 of FIG. 1 can easily specify smoothness localization through computation masks. More specifically, the graphical processing unit 14 of FIG. 1 will derive the initial computation mask from the segmentation performed as a prior step. The graphical processing unit 14 of FIG. 1 filters the resulting flow only inside the mask limits to enhance precision and expediting the implementation. Using graph based minimization approaches, the graphical processing unit 14 of FIG. 1 can precisely target regularity constraints by disconnecting foreground pixels from background pixels.

Figure 2:
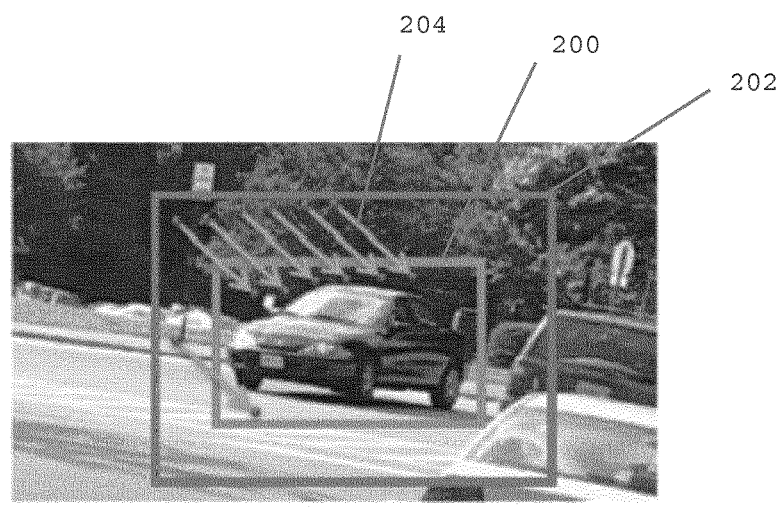
FIG. 2 depicts a screen view of the object tracked by the system of FIG. 1; background.

With the foregoing explanation, the method by which the graphical processing unit of the system 10 of FIG. 1 tracks the object 12 (e.g., a car) can best be appreciated by reference to FIG. 2. The graphical processing unit 14 can initially establish the position of the object 12 (e.g., the car) in FIG. 2 by circumscribing the object with a first bounding box 200, hereinafter referred to as a tracking window. Using a conventional object-tracking algorithm, the graphical processing unit 14 can estimate location of the object 12 in FIG. 2 in the next frame, thus giving a new position of the tracking window 200.

In accordance with the present principles, the graphical processing unit 14 of FIG. 1 circumscribes the tracking window 200 with second bounding box 202, hereinafter referred to as the background region. The background region 202 is larger than the tracking window 202 and determines a background region (e.g., a group of pixels) that includes a portion of the image background surrounding the tracking window but not the tracking window itself. As seen in FIG. 2, a set of pixels lie inside the background region 202 and thus constitute part of the background. In a next frame, these pixels fall into the tracking window 200, as indicated by displacement arrows 204, due to propagation of the background region 202. By estimating the motion of the background region (e.g., the above-described pixels surrounding the object), the graphical processing unit 14 of FIG. 1 can determine which pixels fall into the tracking window in a subsequent frame. The graphical processing unit 14 of FIG. 1 can safely assume that the pixels that previously resided in the background region 202 but now fall into the tracking window in a next frame really belong to the background (as they initially resided outside the tracking window). Thus, the graphical processing unit 14 will appropriately designate such pixels accordingly. Thus, new pixels entering the tracking window now become part of the background. In a next frame, given a new position of the object 12, the graphical processing unit 14 of FIG. 1 will track the pixels previously deemed as part of the background along with the newly entering pixels. If a background pixel does not fall in the tracking window but stays within the surrounding background region, the graphical processing unit 14 of FIG. 1 tracks pixels waiting to enter the tracking window until such pixels enter the tracking window or escape from the background region. In this way the background mask, originally limited to the background region 202 propagates with the tracking window 200, better delineating the segmentation as observed in FIGS. 5A-5D as described hereinafter.

Figure 3:
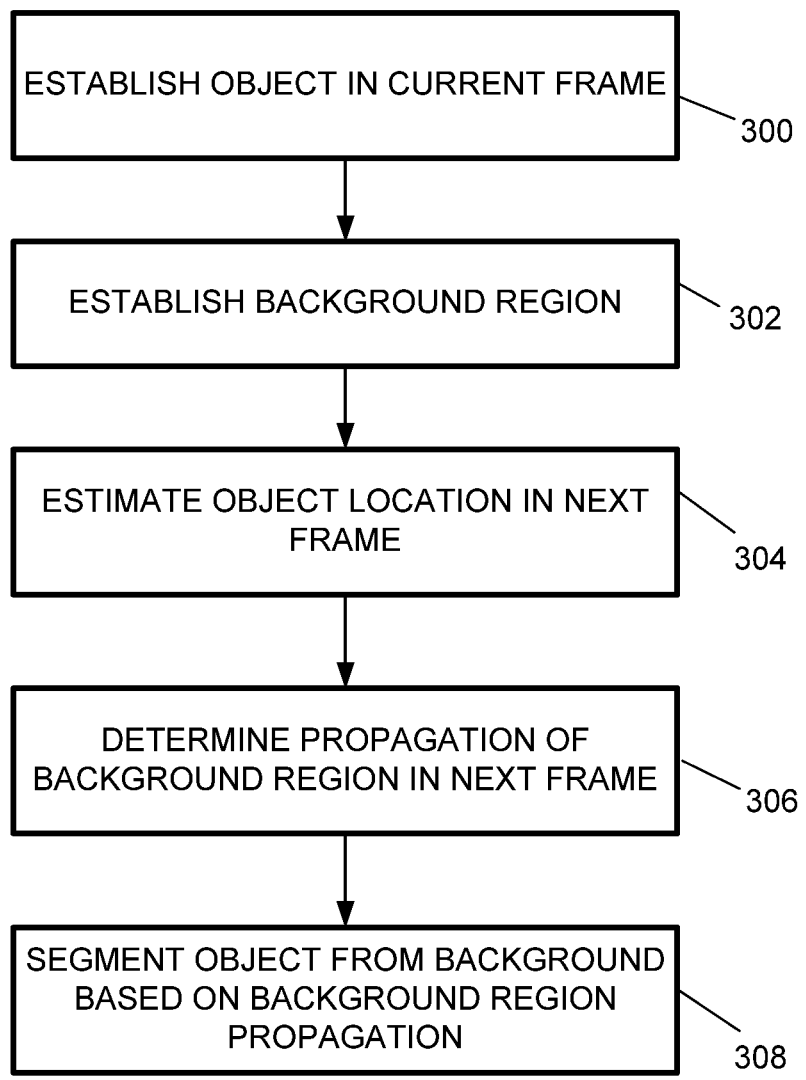
FIG. 3 depicts in flow chart form the steps of a method executed by the system of FIG. 1 for tracking the object shown in FIG. 2.
Figures 4A, 4B, 4C, 4D, 5A, 5B, 5C, 5D:
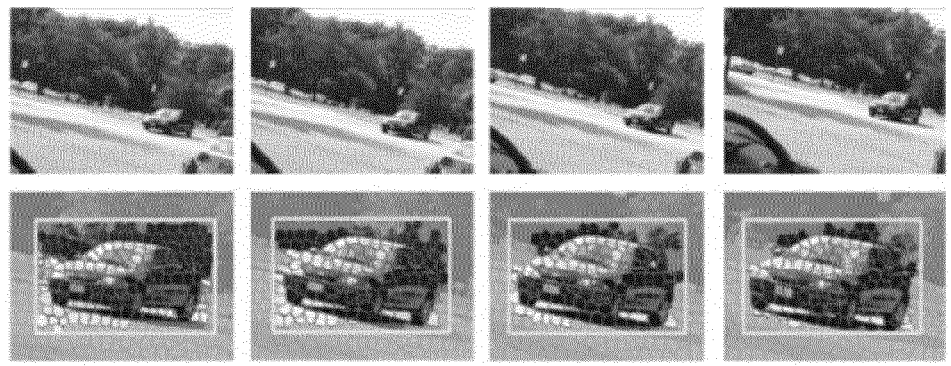
FIGS. 4A-4D depict successive image frames showing movement of an object from frame to frame.
FIGS. 5A-5D depicts tracking windows corresponding to the images in FIGS. 4A-4D, respectively, showing the tracked image segmented from the image background.

FIG. 3 depicts in flow-chart form the steps of a process 300 executed by the graphical processing unit 14 of FIG. 1 to accomplish object tracking as discussed above. The process 300 commences by first establishing the location of the object 12 of FIG. 1 in a current frame during step 300. As discussed previously, the graphical processing unit 14 of FIG. 1 establishes the location of the object 12 by initially circumscribing the object with the tracking window 200 as seen in FIG. 2. Next, during step 302, the graphical processing unit 14 of FIG. 1 establishes a background region, as represented by the background region 202 in FIG. 2. During step 304 of FIG. 3, the graphical processing unit 14 of FIG. 1 estimates the location of the object in a next frame. As discussed above, any of a variety of object tracking techniques, such as optimal filtering, point-tracking, tracking-by-detection, optical-flow, and background subtraction, for example, could accomplish this step. During step 306, the graphical processing unit 14 of FIG. 1 determines the propagation of the background region in the next fame. Based on the propagation of the background region during step 306, the graphical processing unit 14 of FIG. 1 can segment the object from the background during step 308, to facilitate tracking of the object.

To appreciate the image segmentation, refer to FIGS. 4A-4D and 5A-5D. FIGS. 4A-4D depict, from right to left, a sequence images of an object, (e.g., an automobile) in motion. FIGS. 5A-5D each depict a segmentations of the object from the background appearing in a corresponding one of the images depicted in FIGS. 4A-4D, respectively.

The tracking method of the present principles discussed above can include one or more of the following feature. For example, tracking all the background pixels can occur using one of a variety of well-known dense point tracking methods. Further, the graphical processing unit 14 of FIG. 1 could track a sparse set of pixels by any one of a variety of sparse point tracking methods and then extrapolate the segmentation to the other points. As another modification to the tracking method discussed above, the graphical processing unit 14 of FIG. 1 could first apply superpixelation to the background and then tracking superpixels, which is more efficient and robust and has the advantage that such superpixels are usually attached to the object borders.

Moreover, the graphical processing unit 14 of FIG. 1 could use the segmentation obtained as described to better extract and initialize an appearance model of the foreground and background, and refine the segmentation via a standard color-based segmentation technique. Further, .the graphical processing unit 14 of FIG. 1 could use the complement of the background mask, i.e. the foreground mask, to adjust the position of the target by for example, center-of-mass computation, or blob analysis. The graphical processing unit 14 of FIG. 1 could also compute the target location by taking the more distant point to the background or using the distance transform to extract a more plausible position. Further, the graphical processing unit 14 of FIG. 1 can use the tracked background to reject the object location, thereby improving the output of standard tracker methods, notably the tracking-by-detection method.

The graphical processing unit 14 of FIG. 1 could combine several object tracking methods on near-to-the-target objects in the background in order to analyze the non-interest objects entering the tracking window for better handling occlusions and rejection of target object locations. In addition, the graphical processing unit 14 of FIG. 1 could implement tracking in a backward direction, which is equivalent of detecting regions of the background that leave the tracking window to accomplish offline or delayed processing.

The foregoing describes a technique for tracking an object with improved segmentation.

The invention claimed is:
1. A method for tracking an object, comprising:
establishing the object in a current frame by circumscribing the object with a first bounding box;
establishing a background region encompassing the object in the current frame by circumscribing the object with a second bounding box larger than the first bounding box to encompass the object in at least a portion of background surrounding the object;
estimating a location for the object in a next frame;
determining propagation of the background region; and segmenting the object from its background based on propagation of the background region.

2. The method according to claim 1 wherein determining the propagation of the background region includes detecting pixels that originally reside outside the object but inside the tracking window in the current frame but move inside a tracking window encompassing the object in the next frame.

3. The method according to claim 1 further including:
applying superpixelation to the background to yield super pixels attached to borders of the object; and
tracking such superpixels.

4. The method according to claim 1 wherein segmenting the image includes refining the segmentation via a standard color-based segmentation technique.

5. The method according to claim 1 wherein determining propagation of the background region includes tracking all background pixels using a dense point tracking method.

6. Computer program comprising program code instructions executable by a processor for implementing a method according to claim 1.

7. Computer program product which is stored on a non-transitory computer readable medium and comprises program code instructions executable by a processor for implementing a method according to claim 1.

8. System for tracking an object, comprising:
an image acquisition device for capturing images of an object to undergo tracking; and
a processor for processing the image captured by the image acquisition device, for establishing the object in a current frame by circumscribing the object with a first bounding box; (b) establishing a background region encompassing the object in the current frame by of circumscribing the object with a second bounding box larger than the first bounding box to encompass the object in at least a portion of background surrounding the object; (c) estimating a location for the object in a next frame; (d) determining propagation of the background region; and (e) segmenting the object from its background based on propagation of the background region.

9. The system according to claim 8 wherein the processor determines the propagation of the background region by detecting pixels that originally reside outside the object but inside the tracking window in the current frame but move inside a tracking window encompassing the object in the next frame.

10. The system according to claim 8 wherein the processor applies superpixelation to the background to yield super pixels attached to borders of the object and tracks such superpixels.

11. The system according to claim 8 wherein segmenting the image includes refining the segmentation via a standard color-based segmentation technique.

12. The system according to claim 8 wherein the processor determines propagation of the background region by tracking all background pixels using a dense point tracking method.

* * * * *